US008660707B2

(12) United States Patent
Kim

(10) Patent No.: US 8,660,707 B2
(45) Date of Patent: Feb. 25, 2014

(54) AUTOMATIC CUTOFF APPARATUS

(75) Inventor: Hyo-goo Kim, Daejeon (KR)

(73) Assignee: Botem Co., Ltd., Daejeon (KR)

( * ) Notice: Subject to any disclaimer, the term of this patent is extended or adjusted under 35 U.S.C. 154(b) by 307 days.

(21) Appl. No.: 13/142,476

(22) PCT Filed: Dec. 30, 2009

(86) PCT No.: PCT/KR2009/007932
§ 371 (c)(1),
(2), (4) Date: Jun. 28, 2011

(87) PCT Pub. No.: WO2010/077080
PCT Pub. Date: Jul. 8, 2010

(65) Prior Publication Data

US 2012/0016496 A1 Jan. 19, 2012

(30) Foreign Application Priority Data

Dec. 30, 2008 (KR) ........................ 10-2008-0137407

(51) Int. Cl.
*G05B 15/00* (2006.01)

(52) U.S. Cl.
USPC ............................ 700/295; 250/221; 705/412

(58) Field of Classification Search
USPC ............................ 700/295; 250/221; 705/412
See application file for complete search history.

(56) References Cited

U.S. PATENT DOCUMENTS

| | | | | |
|---|---|---|---|---|
| 2004/0133314 | A1 * | 7/2004 | Ehlers et al. | 700/276 |
| 2005/0033707 | A1 * | 2/2005 | Ehlers et al. | 705/412 |
| 2005/0046584 | A1 * | 3/2005 | Breed | 340/825.72 |
| 2006/0208169 | A1 * | 9/2006 | Breed et al. | 250/221 |
| 2008/0065290 | A1 * | 3/2008 | Breed et al. | 701/29 |
| 2008/0177994 | A1 * | 7/2008 | Mayer | 713/2 |
| 2009/0157529 | A1 * | 6/2009 | Ehlers et al. | 705/26 |

FOREIGN PATENT DOCUMENTS

| | | | |
|---|---|---|---|
| JP | 11-353569 | A | 12/1999 |
| JP | 2007-189794 | A | 7/2007 |
| KR | 10-0869048 | B1 | 11/2008 |

* cited by examiner

*Primary Examiner* — Mohammad Ali
*Assistant Examiner* — Anthony Whittington
(74) *Attorney, Agent, or Firm* — The Webb Law Firm

(57) ABSTRACT

Disclosed is an automatic cutoff apparatus that automatically cuts off a power source in a space where people go in and out when it is confirmed that no one is in the space. The apparatus includes: an entrance sensor; at least one moving object sensor; a controller connected to the entrance sensor, the moving object sensor, and configured to cut off the resources in the specific object device when the entrance sensor senses a passage of a moving object but the moving object sensor does not sense a presence of the moving object.

17 Claims, 5 Drawing Sheets

(A)

(B)

AUTOMATIC CUTOFF APPARATUS

TECHNICAL FIELD

The present application claims priority of Korean Patent Application No(s). 10-2008-0137407 filed on Dec. 30, 2008, which is incorporated herein by reference in its entirety.

Exemplary embodiments of the present invention relate to an automatic cutoff apparatus, and more particularly, to an automatic cutoff apparatus that automatically cuts off a power source in a space where people go in and out when it is confirmed that there is no one in the space.

BACKGROUND ART

There are many devices that make the daily life of a modern human being comfortable. For example, there are a tap water supply device supplying clean water conveniently, a gas supply device providing a heating power for cooking at an economical price, and an electricity supply device providing power for lighting and diverse electric devices. These devices are necessarily set up in the living space of a modern person. When a building is a residential space, the building is equipped with all the devices. Even though the building is not a residential space, such as offices and lecture rooms, the electricity supply device is essential.

While these devices make the life of a human being convenient, when there is a breakdown or malfunction, a disastrous accident may occur. In particular, when a breakdown or malfunction occurs and there is no person in a corresponding space and thus the breakdown or malfunction is kept for a long time, the possibility for such a disaster becomes even higher. For example, when a person goes out for a long time with a gas pipe valve open or a gas range switched on without knowing gas leakage, gas leaks out and stays in the interior. Accordingly, when a person enters the space, the person may inhale the gas and fall sick. When there is an inflammable, it may lead to an explosive fire accident.

Other than such a disastrous accident, waste of energy caused by the leakage of electricity and tap water rises as a serious problem as well. Especially, offices, lecture rooms, and public buildings consume a great deal of power because they not only require high illumination but also keep lights turned on and on due to many people going in and out frequently. To take one example, the last person leaving a lecture room after a lecture is over is supposed to turn the lights off. However, it may be obscure who the last person is and according to behavioristic psychology, it is widely known that when a duty is scattered to many people, the possibility that a person completes the duty is decreased drastically. Therefore, lights in a space where many people use are not likely to be turned off properly. Although there is no need to keep lights turned on when there is no person in the space, lights are turned on and on and this wastes a great deal of electricity. Also, because the lights are kept to be turned on for a long time, electric facility may be damaged due to overheat and furniture or interior articles in the space may be deteriorated. This may be another problem.

In other to resolve these problems, apparatuses for automatically cutting off resources in a resources supply device such as a tap water supply device, a gas supply device, and an electricity supply device when no person is sensed in the interior of a space have been disclosed. Conventional apparatuses, however, are designed to count the number of people in a space with a counter. Thus, there is a possibility of malfunction such as sensing and counting a crowd of people simultaneously going in and out of the space as one person.

Therefore, the conventional apparatuses cannot effectively sense whether there is anyone in the space or not. The conventional apparatuses should count the number of people going in and out of the space and have a logic in consideration of diverse unexpected and exceptional circumstances. For example, when a huge load is being carried and a patent or an old man is going in and out, it takes a far longer time than an average time for passage and the apparatuses should be equipped with complicated devices and logics to take them into consideration. With simple devices and logics, the possibility that conventional apparatuses may malfunction becomes high.

DISCLOSURE OF INVENTION

Technical Problem

An embodiment of the present invention is directed to an automatic cutoff apparatus that automatically cut off resources in a resources supply device such as electricity supply device after effectively confirming that there is no one in a space where many people come and go with a simple device and logic.

Solution to Problem

In accordance with an embodiment of the present invention, an apparatus for automatically cutting off resources, which includes: an entrance sensor 10 disposed at or around an entrance of a specific object space 100 to sense a passage of a moving object; at least one moving object sensor 20 disposed in the specific object space 100 and sensing a presence of the moving object in the specific object space 100; a controller 30 which is connected to the entrance sensor 10, the moving object sensor 20, and the specific object device 200 through cable or wirelessly to control the resources for the specific object device 200, and configured to cut off the resources in the specific object device 200 when the entrance sensor 10 senses a passage of a moving object but the moving object sensor 20 does not sense a presence of the moving object.

When the entrance sensor 10 senses a passage of a moving object, the controller 30 may supply or continue to supply the resources in the specific object device 200.

When the entrance sensor 10 senses a passage of a moving object and the moving object sensor 20 senses a presence of a moving object in the specific object space 100, the controller 30 may supply or continue to supply the resources in the specific object device 200.

When the entrance sensor 10 senses a passage of a moving object, the controller 30 operates the moving object sensor 20, and when the entrance sensor 10 senses a passage of a moving object and the moving object sensor 20 senses a presence of a moving object in the specific object space 100, the controller 30 may stop the moving object sensor 20 from operating.

When the entrance sensor 10 senses a passage of a moving object, the controller 30 may operate the moving object sensor 20, and after performing an operation of cutting off, supplying or continuing to supply the resources in the specific object device 200, the controller 30 may stop the moving object sensor 20 from operating.

The apparatus may further include a timer 40.

When the entrance sensor 10 senses a passage of a moving object, the controller 30 may operate the timer 40, and when the moving object sensor 20 does not sense a presence of a moving object in the specific object space 100 within a first predetermined time, the controller 30 may cut off or continues to cut off the resources in the specific object device 200.

When the first predetermined time may range from about 5 seconds to about 5 minutes.

When the entrance sensor 10 senses a passage of a moving object, the controller 30 may operate the timer 40, and when the moving object sensor 20 does not sense a presence of a moving object in the specific object space 100 within a first predetermined time, the controller 30 may cut off or continue to cut off the resources from the specific object device 200, and when the moving object sensor 20 senses a presence of a moving object in the specific object space 100 within a second predetermined time, the controller 30 may resume supplying the resources in the specific object device 200.

The first predetermined time and the second predetermined time may range from about 5 seconds to about 5 minutes, individually.

When the specific object space 100 has at least one entrance, the automatic cutoff apparatus may be connected to and operate with at least one entrance sensor 10 set up for each entrance.

The specific object device 200 may be at least one device selected from the group consisting of a gas supply device, a tap water supply device, and an electricity supply device.

Advantageous Effects of Invention

The technology of one embodiment of the present invention can effectively prevent diverse safety-threatening accidents that may occur in a space with no one by closing a device set up in the space, such as a gas supply device, a tap water device, an electricity supply device and the like. Also, the technology of one embodiment of the present invention can effectively sense the non-existence of a person with a simple device and logic and closing such a device. Although the apparatus of the embodiment of the present invention operates effectively, the costs for manufacturing of devices and installation are not expensive because the apparatus employs simple devices and logic.

MODE FOR THE INVENTION

Figure 1:
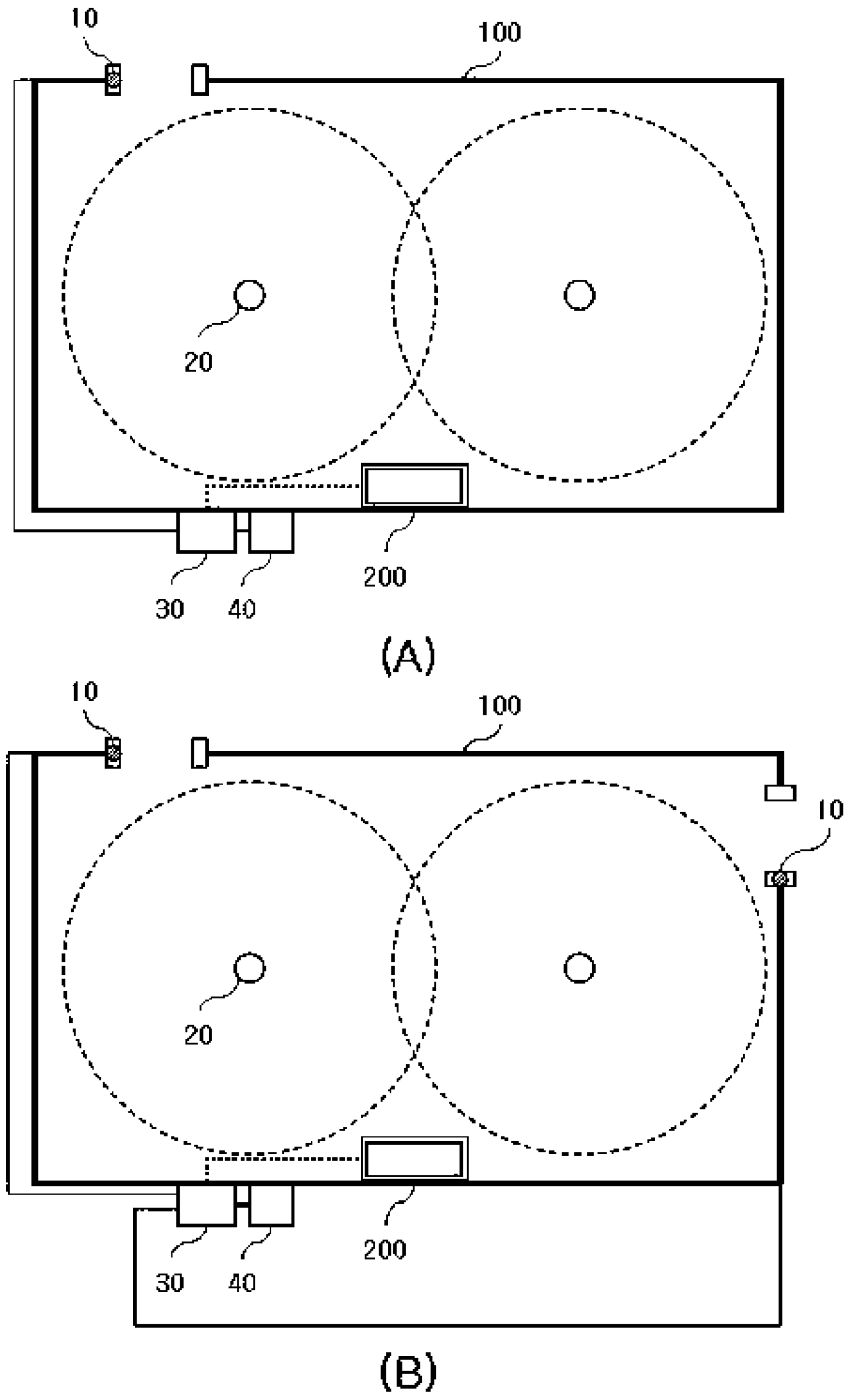
FIGS. 1A and 1B illustrate an automatic cutoff apparatus in accordance with an embodiment of the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The drawings are not necessarily to scale and in some instances, proportions may have been exaggerated in order to clearly illustrate features of the embodiments.

FIGS. 1A and 1B illustrate an automatic cutoff apparatus in accordance with an embodiment of the present invention. The automatic cutoff apparatus is connected to a specific object device 200 set up in a specific object space 100. The specific object device 200 is a device that can supply/cut off external resources, and non-limiting examples of the specific object device 200 include a tap water supply device, e.g., a tap of tap water, a gas supply device, e.g., a gas valve, and an electricity supply device, e.g., an electricity switch. The specific object device 200 may be automatically opened/closed, or it may be an automatic supply/cutoff device for a conventional tap of tap water, a gas valve, or an electricity switch that is manually opened/closed. The specific object device 200 may be manually opened/closed at any time.

The specific object space 100 includes residing spaces such as houses and apartments, lecture rooms, offices, business places and public buildings and the specific object space 100 is equipped with the specific object device 200. A space where the inside and the outside is separated from each other may be the specific object space 100.

The automatic cutoff apparatus according to one embodiment of the present invention includes an entrance sensor 10, at least one moving object sensor 20, and a controller 30 connected to the entrance sensor 10 and the moving object sensor 20. These constituent elements will be described hereafter in detail.

As illustrated in FIG. 1A, the entrance sensor 10 is set up at or around an entrance of the specific object space 100 to sense a moving object going in and out of the specific object space 100. When there are a plurality of entrances in the specific object space 100, as illustrated in FIG. 1B, the entrance sensor 10 is set up in each entrance. In short, one specific object space 100 may be provided with a plurality of entrance sensors 10.

The entrance sensor 10 is designed to sense an object going in and out of the entrance. Herein, the entrance sensor 10 does not sense the moving direction of the moving object, that is, it does not sense whether the moving object is going into the specific object space 100 or going out of the specific object space 100. The entrance sensor 10 simply senses a passage of the moving object by sensing the existence of the moving object passing through the entrance of the specific object space 100. The entrance sensor 10 may be realized in a simple form. For example, the entrance sensor 10 may be one infrared ray sensor.

The moving object sensor 20 is positioned in the inside of the specific object space 100 to sense the existence of the moving object in the specific object space 100. As illustrated in FIG. 1, when the specific object space 100 is wider than the sensing coverage of the moving object sensor 20, a plurality of the moving object sensors 20 may be set up. When the moving object sensor 20 can cover the entire inside of the specific object space 100, or when it is sufficient by setting up the moving object sensor 20 at a position where people are highly likely to be, only one moving object sensor 20 may be set up.

The controller 30 is connected to the specific object device 200 set up in the specific object space 100, the entrance sensor

10, and the moving object sensor 20 through cable or wirelessly, and supplies or cuts off resources, such as tap water, gas or electricity in the specific object device 200. Hereafter, the operation method of the controller 30 will be described in detail.

Figure 2:
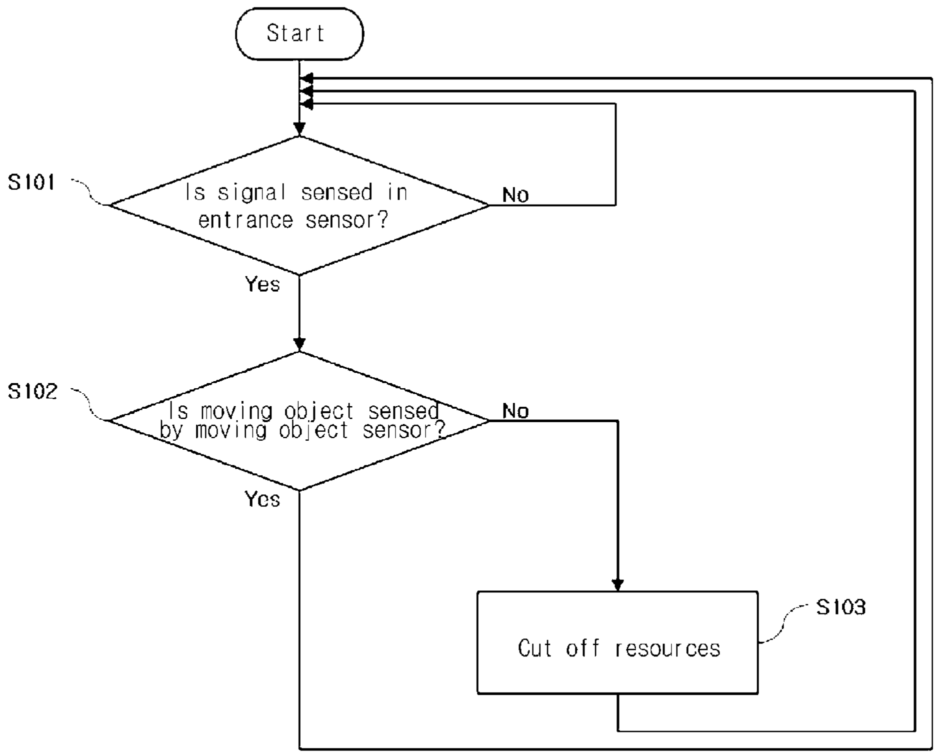
FIG. 2 is a flowchart describing an operation of an automatic cutoff apparatus in accordance with a first embodiment of the present invention.

FIG. 2 is a flowchart describing an operation of an automatic cutoff apparatus in accordance with a first embodiment of the present invention. In step S101, the controller 30 determines whether the entrance sensor 10 senses a passage of a moving object. When a moving object passes through an entrance of the specific object space 100, its passage is sensed by the entrance sensor 10. In step S 102, the controller 30 determines whether the moving object is sensed by the moving object sensor 20. When the moving object sensor 20 senses no moving object, the controller 30 cuts off the resources in the specific object device 200.

In the first embodiment, the controller 30 senses a passage of a moving object with the entrance sensor 10, and when the moving object sensor 20 senses no moving object inside the specific object space 100, the controller 30 cuts off corresponding resources in the specific object device 200.

With the controller 30 operating as shown in the flowchart of FIG. 2, although the entrance sensor 10 does not sense whether the moving object goes in or goes out of the specific object space 100 (that is, although the entrance sensor 10 does not sense the moving direction of the moving object), the occurrence of a passage is sensed and then whether the moving object goes in or goes out of the specific object space 100 is determined by determining whether there is any moving object inside the specific object space 100. Accordingly, it is possible to accurately determine whether to cut off the resources or not.

Figure 3:
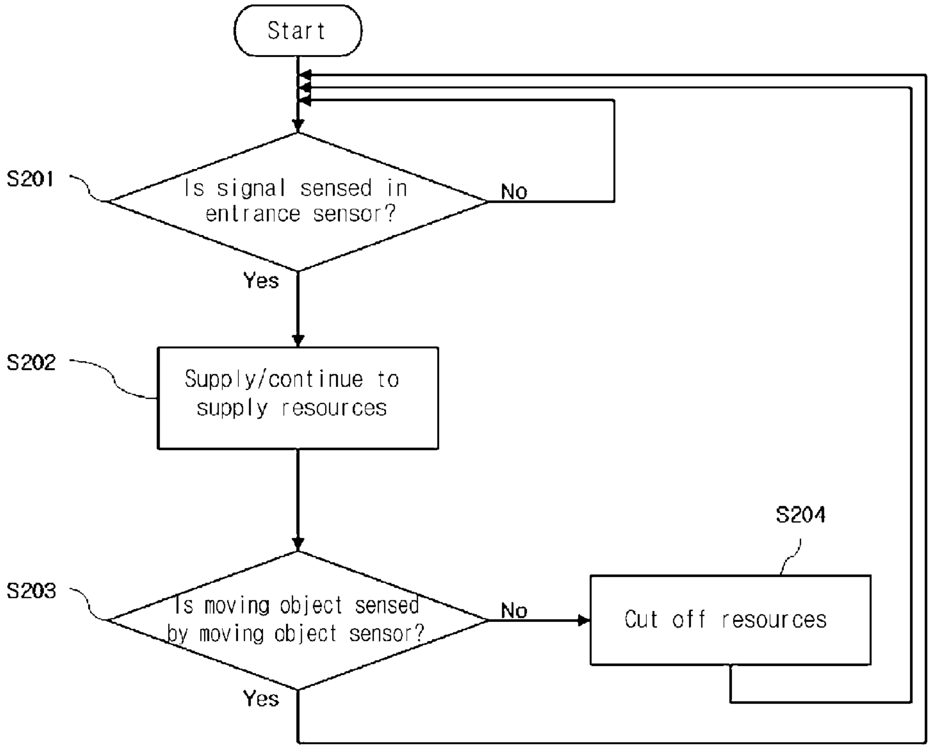
FIG. 3 is a flowchart describing an operation of an automatic cutoff apparatus in accordance with a second embodiment of the present invention.

FIG. 3 is a flowchart describing an operation of an automatic cutoff apparatus in accordance with a second embodiment of the present invention. In step S201, the controller 30 determines whether the entrance sensor 10 senses a passage of a moving object. When a moving object passes through an entrance of the specific object space 100, its passage is sensed by the entrance sensor 10. In step S202, the controller 30 supplies or continues to supply resources in the specific object device 200. In step S203, the controller 30 determines whether the moving object is sensed by the moving object sensor 20. When the moving object sensor 20 senses no moving object, the controller 30 cuts off the resources in the specific object device 200.

In the second embodiment, when the entrance sensor 10 senses a passage of a moving object, the controller 30 automatically supplies or continues to supply the resources in the specific object device 200, and even after the entrance sensor 10 senses a passage of a moving object, if the moving object sensor 20 does not sense any presence of a moving object, the controller 30 cuts off the resources in the specific object device 200.

Since the controller 30 operates as shown in the flowchart of FIG. 3, although the entrance sensor 10 does not sense a passage of a moving object (that is, although the entrance sensor 10 does not sense the moving direction of the moving object), if the entrance sensor 10 senses a passage, the controller 30 automatically supplies the resources and then it determines whether to cut off the resources or not by determining whether or not there is a moving object inside the specific object space 100. Also, according to the first embodiment, when a person goes out of the specific object space 100, only an operation of cutting off the resources may be performed. However, according to the second embodiment, not only the resources are automatically cut off when a person goes out of the specific object space 100, but also the resources are automatically supplied when a person goes into the specific object space 100. Therefore, the convenience is enhanced even more.

In the second embodiment, while a first person goes into the specific object space 100 and the resources are being supplied, a second person may go into the specific object space 100 through the entrance or the first person may go back and forth around the entrance and the entrance sensor 10 senses another passage to thereby restart the operation flow of FIG. 3. In this case, since the resources are already supplied in the specific object device 200, the resources are not re-supplied but continue to be supplied. Therefore, in the operation flow of FIG. 3, the operation is shown as supply/continue to supply resources and the supply/continue to supply resources expression may be understood the same in the other embodiments.

Figure 4:
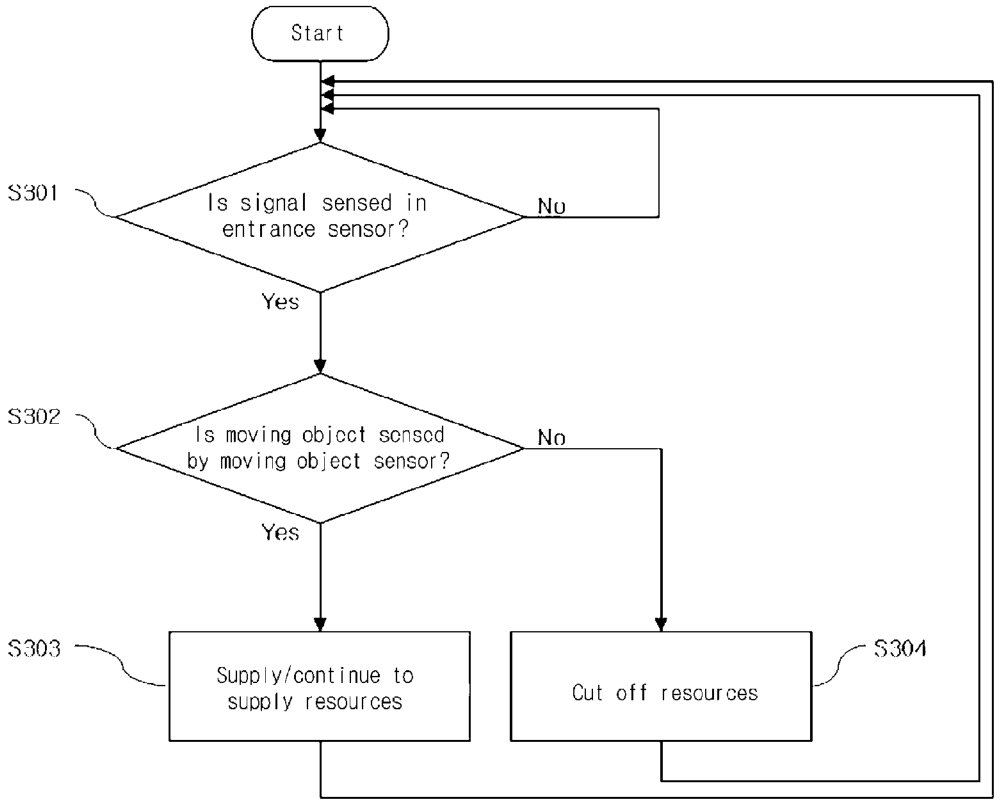
FIG. 4 is a flowchart describing an operation of an automatic cutoff apparatus in accordance with a third embodiment of the present invention.

FIG. 4 is a flowchart describing an operation of an automatic cutoff apparatus in accordance with a third embodiment of the present invention. In step S301, the controller 30 determines whether the entrance sensor 10 senses a passage of a moving object. When a moving object passes through an entrance of the specific object space 100, its passage is sensed by the entrance sensor 10. In step S302, the controller 30 determines whether a moving object is sensed by the moving object sensor 20 in the specific object space 100 or not. When a moving object is sensed by the moving object sensor 20, the controller 30 supplies or continues to supply resources in the specific object device 200 in step S303. When no moving object is sensed by the moving object sensor 20, the controller 30 cuts off the resources in the specific object device 200 in step S304.

In the third embodiment, when the entrance sensor 10 senses a passage of a moving object and the moving object sensor 20 senses a moving object in the specific object space 100, the controller 30 supplies or continues to supply the resources in the specific object device 200. When the entrance sensor 10 senses a passage of a moving object and the moving object sensor 20 senses no moving object in the specific object space 100, the controller 30 cuts off the resources in the specific object device 200.

Since the controller 30 operates as shown in the flowchart of FIG. 4, although the entrance sensor 10 does not sense a passage of a moving object (that is, although the entrance sensor 10 does not sense the moving direction of the moving object), if the entrance sensor 10 senses a passage, the controller 30 determines whether the moving object goes into the specific object space 100 or goes out of the specific object space 100 based on whether there is any moving object sensed in the specific object space 100 and according the controller 30 accurately determines whether to cut off the resources or not.

In the second embodiment, too, when a first person stays in the specific object space 100 and a second person goes into the specific object space 100 through the entrance or the first person goes back and forth around the entrance and the entrance sensor 10 senses another passage to thereby restart the operation flow of FIG. 4, since the resources are already supplied in the specific object device 200, the resources are not re-supplied but continue to be supplied. Therefore, in the operation flow of FIG. 4, the operation is shown as supply/continue to supply resources and the supply/continue to supply resources expression may be understood the same in the other embodiments. Hereafter, the expression supply/continue to supply resources will not be described any more.

Figure 5:
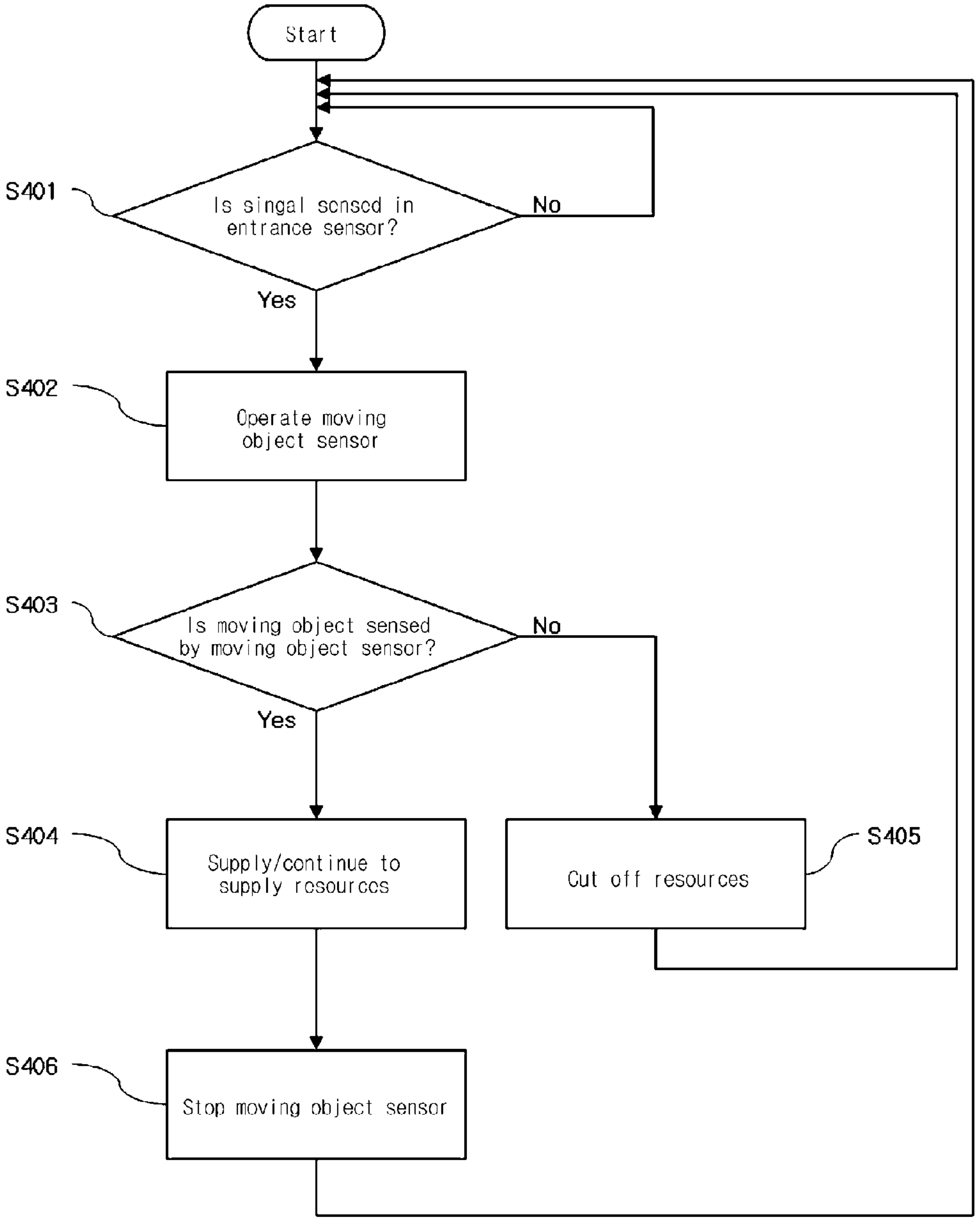
FIG. 5 is a flowchart describing an operation of an automatic cutoff apparatus in accordance with a forth embodiment of the present invention.

FIG. 5 is a flowchart describing an operation of an automatic cutoff apparatus in accordance with a forth embodiment of the present invention. Just like the first to third embodiments, in step S401, the controller 30 determines whether the entrance sensor 10 senses a passage of a moving object. When a moving object passes through an entrance of the specific object space 100, its passage is sensed by the entrance sensor 10. In step S402, the controller 30 operates the moving object sensor 20. In step S403, the controller 30 determines whether a moving object is sensed by the moving object sensor 20 in the specific object space 100 or not. When a moving object is sensed by the moving object sensor 20, the controller 30 supplies or continues to supply resources in the specific object device 200 in step S404 and stops operating the moving object sensor 20 in step S406. When no moving object is sensed by the moving object sensor 20, the controller 30 cuts off the resources in the specific object device 200 in step S405.

In the fourth embodiment, just like the third embodiment, when the entrance sensor 10 senses a passage of a moving object and the moving object sensor 20 senses a moving object in the specific object space 100, the controller 30 supplies the resources in the specific object device 200. When the entrance sensor 10 senses a passage of a moving object and the moving object sensor 20 senses no moving object in the specific object space 100, the controller 30 cuts off the resources in the specific object device 200 and it performs an additional operation of operating or stopping the moving object sensor 20 based on whether a moving object goes in or out. According to the fourth embodiment, when the entrance sensor 10 senses a passage of a moving object, the controller 30 operates the moving object sensor 20. However, after the entrance sensor 10 senses a passage of a moving object and the moving object sensor 20 senses the moving object in the specific object space 100, the moving object sensor 20 stops operating.

In the fourth embodiment, when a moving object is sensed in the specific object space 100 and it is confirmed that there is a person in the specific object space 100, it does not have to sense the moving object any more and interior moving object sense signals generated whenever the person moves inside the specific object space 100 should be neglected. In other to avoid this problem, the controller 30 stops operating the moving object sensor 20 after it confirms the presence of the person inside the specific object space 100. In this way, it is possible to save power consumed by the moving object sensor 20.

Additional controlling of the operation of the moving object sensor 20, which is described above, may be applied to the first embodiment as well, which shows a case when a person goes out of the specific object space 100 and only an operation of cutting off the resources is performed.

Figure 6:
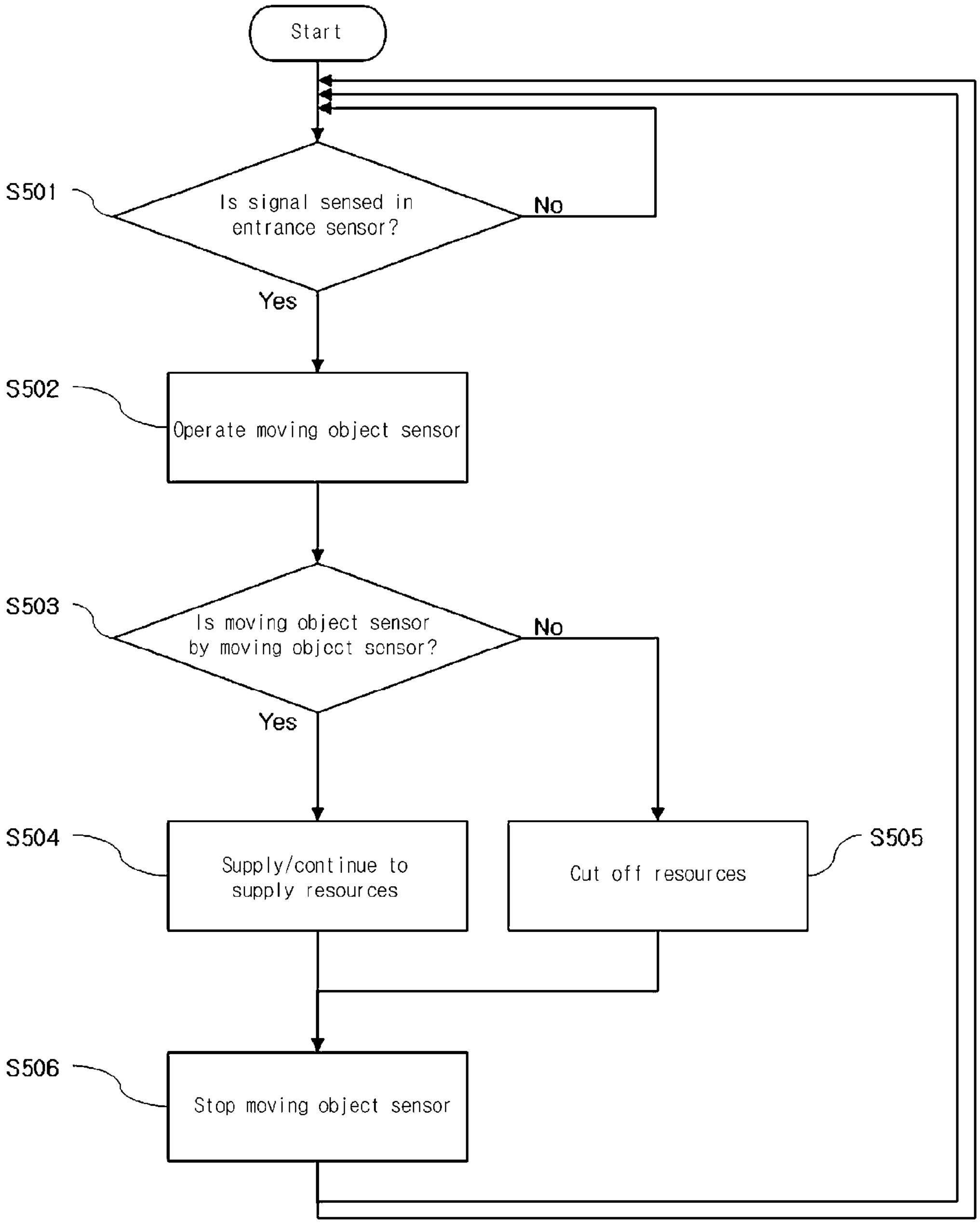
FIG. 6 is a flowchart describing an operation of an automatic cutoff apparatus in accordance with a fifth embodiment of the present invention.

FIG. 6 is a flowchart describing an operation of an automatic cutoff apparatus in accordance with a fifth embodiment of the present invention. Just like the first to fourth embodiments, in step S501, the controller 30 determines whether the entrance sensor 10 senses a passage of a moving object. When a moving object passes through an entrance of the specific object space 100, its passage is sensed by the entrance sensor 10. In step S502, the controller 30 operates the moving object sensor 20. In step S503, the controller 30 determines whether a moving object is sensed by the moving object sensor 20 in the specific object space 100 or not. When a moving object is sensed by the moving object sensor 20, the controller 30 supplies or continues to supply resources in the specific object device 200 in step S504. When no moving object is sensed by the moving object sensor 20, the controller 30 cuts off the resources in the specific object device 200 in step S505. Lastly, in step S506, the controller 30 stops operating the moving object sensor 20 after performing an operation of supplying or cutting off the resources in the specific object device 200.

In the fifth embodiment, just like the third embodiment, when the entrance sensor 10 senses a passage of a moving object and the moving object sensor 20 senses a moving object in the specific object space 100, the controller 30 supplies the resources in the specific object device 200. When the entrance sensor 10 senses a passage of a moving object and the moving object sensor 20 senses no moving object in the specific object space 100, the controller 30 cuts off the resources in the specific object device 200 and it performs an additional operation of operating or stopping the moving object sensor 20 based on whether a moving object goes in or out and whether the resources are supplied or cut off. According to the fifth embodiment, when the entrance sensor 10 senses a passage of a moving object, the controller 30 operates the moving object sensor 20. However, after the resources are supplied to or cut off from the specific object device 200, the moving object sensor 20 stops operating.

The fifth embodiment is similar to the fourth embodiment. While the moving object sensor 20 stops operating after it is confirmed that there is a person in the specific object space 100 in the fifth embodiment, the moving object sensor 20 stops operating unconditionally after an operation of supplying or cutting off the resources in the specific object device 200 regardless of whether there is a person in the specific object space 100 or not in the fifth embodiment.

When it is confirmed that there is a person in the specific object space 100, that is, after an operation of supplying the resources in the specific object device 200 is performed, the moving object sensor 20 does not have to continue to sense the moving object and stops operating so as to save power, which is the same as in the fourth embodiment. Meanwhile, after it is confirmed that there is no one in the specific object space 100, that is, when an operation of cutting off the resources in the specific object device 200, when a person goes into the specific object space 100, the moving object sensor 20 should sense the moving object. However, when a moving object goes into the specific object space 100 where there is no one, the passage of the moving object should be sensed by the entrance sensor 10. Therefore, when there is no one in the specific object space 100, the moving object sensor 20 does not have to operate continuously and the moving object sensor 20 may resume operating after the entrance sensor 10 senses a passage. According to the control in the fifth embodiment, the power consumption consumed by the moving object sensor 20 may be reduced even more than that in the fourth embodiment.

Additional controlling of the operation of the moving object sensor 20, which is described above, may be applied to the first embodiment as well, which shows a case when a person goes out of the specific object space 100 and only an operation of cutting off the resources is performed.

The automatic cutoff apparatus shown in FIG. 1 may further include a timer 40. The timer 40 measures time and with the controller, the controller 30 may be programmed to perform diverse operations.

According to a sixth embodiment, when the entrance sensor 10 senses a passage of a moving object, the controller 30 operates the timer 40 and if the moving object sensor 20 does not sense a moving object in the specific object space 100 within a first predetermined time, the controller 30 may operate to cut off or continue to cut off the resources in the specific object device 200. In this case, the first predetermined time may range from about 5 seconds to about 5 minutes. Herein, the operation of the timer 40 may be performed right after the entrance sensor 10 senses the passage of a moving object as shown in the first to fourth embodiments of FIGS. 2 to 5.

According to a seventh embodiment, when the entrance sensor 10 senses a passage of a moving object, the controller 30 operates the timer 40 and if the moving object sensor 20 does not sense a moving object in the specific object space 100 within a first predetermined time, the controller 30 may operate to cut off or continue to cut off the resources in the specific object device 200. However, if the moving object sensor 20 senses the moving object in the specific object space 100 within a second predetermined time, the controller 30 may operate to resume supplying the resources in the specific object device 200. In this case, the second predetermined time may also range from about 5 seconds to about 5 minutes. Herein, the first operation of the timer 40, which is the measurement of the first predetermined time, may be performed right after the entrance sensor 10 senses the passage of a moving object as shown in the first to fourth embodiments of FIGS. 2 to 5. The second operation of the timer 40, which is the measurement of the second predetermined time, may be performed right after the operation of cutting off the resources in the specific object device 200.

As described, with the timer 40, the controller 30 controls the operations of cutting off/supplying/continuing to supply the resources. Thus, the controller 30 can perform delicate controls and cope with diverse circumstances.

For example, when there is no one in the specific object space 100, that is, the resources are cut off, and there is a person going back and forth around an entrance or there is a person carrying a big box and the person is sensed by the entrance sensor 10 as passing through the entrance, the person may not be entering the specific object space 100. This motion may be regarded as noise. To take another example, when the automatic cutoff apparatus operates based on the operation flow of the second embodiment shown in FIG. 3, the resources are supplied as soon as the passage through an entrance is sensed. Since the moving object sensor 20 does not sense the moving object in the specific object space 100, the operation of cutting off resources is normally performed. However, if there are people frequently moving around the entrance and noise occurs very often, the operations of supplying and cutting off the resources are performed repeatedly and this may lead to wasteful consumption of power. However, when the timer 40 is used as in the sixth embodiment, although there is a passage sensed by the entrance sensor 10, electricity is supplied after confirming whether there is any moving object sensed in the specific object space 100 for the first predetermined time. Therefore, it is possible to prevent wasteful consumption of power.

To take yet another example, a person may enter the specific object space 100 but he may stand still without any motion for some unknown reason. In this case, when the automatic cutoff apparatus operates according to the sixth embodiment, the passage of the person is sensed but the moving object sensor 20 does not sense the person within the first predetermined time. Therefore, the resources are not supplied and cut off. However, when the automatic cutoff apparatus operates according to the seventh embodiment, although the moving object sensor 20 does not sense the person within the first predetermined time, if the moving object sensor 20 senses the person within the second predetermined time, the controller 30 resumes supplying the resources.

In the above embodiments, the first predetermined time and the second predetermined time may range from about 5 seconds to about 5 minutes. The first predetermined time and the second predetermined time may be set up appropriately according to the kinds, usage purposes, and characteristics of the specific object space 100 and the specific object device 200. For example, when the specific object space 100 where the automatic cutoff apparatus of the present invention is set up in a bathroom of a personal residing space and the specific object device 200 is an electric light of the bathroom, it is preferred that the automatic cutoff apparatus spontaneously operates when a person goes into the bathroom or goes out of the bathroom. Therefore, the first predetermined time and the second predetermined time may range from about 5 seconds to about 10 seconds. On the other hand, when the specific object space 100 where the automatic cutoff apparatus of the present invention is set up in a large lecture room and the specific object device 200 is an air conditioner in the lecture room, it is preferred that the first predetermined time and the second predetermined time are longer. Although the air conditioner is turned on, the temperature of the lecture room does not go down instantly and it takes a predetermined time to cool down the lecture room. Also, although the air conditioner is turned off, the lecture room contains the cold air for the time being. In other words, while the case of the electric light has almost no time difference between the on/off operation and its effect, the case of the air conditioner has some time difference between its on/off operation and its effect. Herein, when the air conditioner is turned on, the lecture room is cooled down and when the air conditioner is turned off, cooling the lecture room stops. Therefore, when the specific object device 200 is the air conditioner in the lecture room, it is preferred to set the first predetermined time and the second predetermined time longer, for example, from about 3 minutes to about 5 minutes.

To sum up, the description the first predetermined time and the second predetermined time may range from about 5 seconds to about 5 minutes signifies that the first predetermined time and the second predetermined time may be diverse time ranges according to the kinds and characteristics of the specific object device 200 and the specific object space 100. When the specific object device 200 is an electric light, the first predetermined time and the second predetermined time may range from about 5 seconds to about 10 seconds. When the specific object device 200 is an air conditioner, the first predetermined time and the second predetermined time may range from about 3 minutes to about 5 minutes. In short, the first predetermined time and the second predetermined time may be determined according to the characteristics and purposes of the specific object space 100 and/or the specific object device 200.

While the present invention has been described with respect to the specific embodiments, it will be apparent to those skilled in the art that various changes and modifications may be made without departing from the spirit and scope of the invention as defined in the following claims.

The invention claimed is:

1. An apparatus for automatically cutting off resources, comprising:

an entrance sensor disposed at or around an entrance of a specific object space to sense a passage of a moving object;

at least one moving object sensor disposed in the specific object space and sensing a presence of the moving object in the specific object space;

a controller which is connected to the entrance sensor, the moving object sensor, and the specific object device through cable or wirelessly to control the resources for the specific object device, and configured to cut off the resources in the specific object device when the entrance sensor senses a passage of a moving object but the moving object sensor does not sense a presence of the moving object; and a timer wherein when the entrance sensor senses a passage of a moving object, the controller operates the timer, and when the moving object sensor does not sense a presence of a moving object in the specific object space within a first predetermined time, the controller cuts off or continues to cut off the resources in the specific object device.

2. The apparatus of claim 1, wherein when the entrance sensor senses a passage of a moving object, the controller supplies or continues to supply the resources in the specific object device.

3. The apparatus of claim 1, wherein when the entrance sensor senses a passage of a moving object and the moving object sensor senses a presence of a moving object in the specific object space, the controller supplies or continues to supply the resources in the specific object device.

4. The apparatus of claim 1, wherein when the entrance sensor senses a passage of a moving object, the controller operates the moving object sensor, and when the entrance sensor senses a passage of a moving object and the moving object sensor senses a presence of a moving object in the specific object space, the controller stops the moving object sensor from operating.

5. The apparatus of claim 2, wherein when the entrance sensor senses a passage of a moving object, the controller operates the moving object sensor, and when the entrance sensor senses a passage of a moving object and the moving object sensor senses a presence of a moving object in the specific object space, the controller stops the moving object sensor from operating.

6. The apparatus of claim 3, wherein when the entrance sensor senses a passage of a moving object, the controller operates the moving object sensor, and when the entrance sensor senses a passage of a moving object and the moving object sensor senses a presence of a moving object in the specific object space, the controller stops the moving object sensor from operating.

7. The apparatus of claim 1, wherein when the entrance sensor senses a passage of a moving object, the controller operates the moving object sensor, and after performing an operation of cutting off, supplying or continuing to supply the resources in the specific object device, the controller stops the moving object sensor from operating.

8. The apparatus of claim 2, wherein when the entrance sensor senses a passage of a moving object, the controller operates the moving object sensor, and after performing an operation of cutting off, supplying or continuing to supply the resources in the specific object device, the controller stops the moving object sensor from operating.

9. The apparatus of claim 3, wherein when the entrance sensor senses a passage of a moving object, the controller operates the moving object sensor, and after performing an operation of cutting off, supplying or continuing to supply the resources in the specific object device, the controller stops the moving object sensor from operating.

10. The apparatus of claim 1, wherein the first predetermined time ranges from about 5 seconds to about 5 minutes.

11. The apparatus of claim 1, wherein when the entrance sensor senses a passage of a moving object, the controller operates the timer, and when the moving object sensor does not sense a presence of a moving object in the specific object space within a first predetermined time, the controller cuts off or continues to cut off the resources from the specific object device, and when the moving object sensor senses a presence of a moving object in the specific object space within a second predetermined time, the controller resumes supplying the resources in the specific object device.

12. The apparatus of claim 11, wherein the first predetermined time and the second predetermined time range from about 5 seconds to about 5 minutes, individually.

13. The apparatus of claim 1, wherein when the specific object space has at least one entrance, the automatic cutoff apparatus is connected to and operate with at least one entrance sensor set up for each entrance.

14. The apparatus of claim 1, wherein the specific object device is at least one device selected from the group consisting of a gas supply device, a tap water supply device, and an electricity supply device.

15. An apparatus for automatically cutting off resources, comprising:

an entrance sensor disposed at or around an entrance of a specific object space to sense a passage of a moving object;

at least one moving object sensor disposed in the specific object space and sensing a presence of the moving object in the specific object space; and a controller which is connected to the entrance sensor, the moving object sensor, and the specific object device through cable or wirelessly to control the resources for the specific object device, and configured to cut off the resources in the specific object device when the entrance sensor senses a passage of a moving object but the moving object sensor does not sense a presence of the moving object, wherein when the entrance sensor senses a passage of a moving object and the moving object sensor senses a presence of a moving object in the specific object space, the controller supplies or continues to supply the resources in the specific object device, and wherein when the entrance sensor senses a passage of a moving object, the controller operates the moving object sensor, and when the entrance sensor senses a passage of a moving object and the moving object sensor senses a presence of a moving object in the specific object space, the controller stops the moving object sensor from operating.

16. An apparatus for automatically cutting off resources, comprising:

an entrance sensor disposed at or around an entrance of a specific object space to sense a passage of a moving object;

at least one moving object sensor disposed in the specific object space and sensing a presence of the moving object in the specific object space; and a controller which is connected to the entrance sensor, the moving object sensor, and the specific object device through cable or wirelessly to control the resources for the specific object device, and configured to cut off the resources in the specific object device when the entrance sensor senses a passage of a moving object but the moving object sensor does not sense a presence of the moving object, wherein when the entrance sensor senses a passage of a moving object and the moving object sensor senses a presence of a moving object in the specific object space, the controller supplies or continues to supply the resources in the specific object device, and wherein when the entrance sensor senses a passage of a moving object, the controller operates the moving object sensor, and after performing an operation of cutting off, supplying or continuing to supply the resources in the specific object device, the controller stops the moving object sensor from operating.

17. An apparatus for automatically cutting off resources, comprising:

an entrance sensor disposed at or around an entrance of a specific object space to sense a passage of a moving object;

at least one moving object sensor disposed in the specific object space and sensing a presence of the moving object in the specific object space;

a controller which is connected to the entrance sensor, the moving object sensor, and the specific object device through cable or wirelessly to control the resources for the specific object device, and configured to cut off the resources in the specific object device when the entrance sensor senses a passage of a moving object but the moving object sensor does not sense a presence of the moving object; and a timer, wherein when the entrance sensor senses a passage of a moving object, the controller operates the timer, and when the moving object sensor does not sense a presence of a moving object in the specific object space within a first predetermined time, the controller cuts off or continues to cut off the resources from the specific object device, and when the moving object sensor senses a presence of a moving object in the specific object space within a second predetermined time, the controller resumes supplying the resources in the specific object device.

* * * * *